(12) United States Patent
Endou

(10) Patent No.: US 10,481,591 B2
(45) Date of Patent: Nov. 19, 2019

(54) NUMERICAL CONTROLLER

(71) Applicant: FANUC CORPORATION, Minamitsuru-gun, Yamanashi (JP)

(72) Inventor: Katsuhiro Endou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 158 days.

(21) Appl. No.: 15/655,200

(22) Filed: Jul. 20, 2017

(65) Prior Publication Data

US 2018/0032063 A1 Feb. 1, 2018

(30) Foreign Application Priority Data

Jul. 26, 2016 (JP) ................ 2016-145958

(51) Int. Cl.
| | | |
|---|---|---|
| *G05B 19/00* | (2006.01) | |
| *G05B 19/416* | (2006.01) | |
| *G05B 19/402* | (2006.01) | |

(52) U.S. Cl.
CPC ....... *G05B 19/4163* (2013.01); *G05B 19/402* (2013.01); *G05B 19/4166* (2013.01); *G05B 2219/35459* (2013.01); *G05B 2219/43001* (2013.01)

(58) Field of Classification Search
None
See application file for complete search history.

(56) References Cited

U.S. PATENT DOCUMENTS

| | | | |
|---|---|---|---|
| 4,402,576 A | 9/1983 | Stahl et al. | |
| 4,510,427 A * | 4/1985 | Nozawa | G05B 19/40 318/443 |
| 5,283,508 A | 2/1994 | Komatsu | |
| 5,493,193 A | 2/1996 | Seki et al. | |
| 5,682,319 A * | 10/1997 | Boland | G05B 19/4068 318/573 |

FOREIGN PATENT DOCUMENTS

| | | |
|---|---|---|
| JP | S5745513 A | 3/1982 |
| JP | S61068219 A | 4/1986 |
| JP | 4-348843 | 12/1992 |
| JP | H0534601 A | 2/1993 |
| JP | H062323 U | 1/1994 |
| JP | H06114681 A | 4/1994 |
| JP | H06143091 A | 5/1994 |
| JP | H06304845 A | 11/1994 |
| JP | H0811038 A | 1/1996 |
| JP | H11109246 A | 4/1999 |

OTHER PUBLICATIONS

Notice of Grounds for Rejection for Japanese Application No. 2016-145958, dated Sep. 25, 2018, with translation, 8 pages.

* cited by examiner

*Primary Examiner* — Paul B Yanchus, III
(74) *Attorney, Agent, or Firm* — RatnerPrestia

(57) ABSTRACT

A machine tool controlled by a numerical controller includes a feed handle for driving a drive-shaft for moving a tool and a workpiece relatively by using a mechanical mechanism and a motor for driving the drive shaft. The numerical controller generates an automatic feed command for driving the motor when a specific handle operation performed on the feed handle is detected.

9 Claims, 16 Drawing Sheets

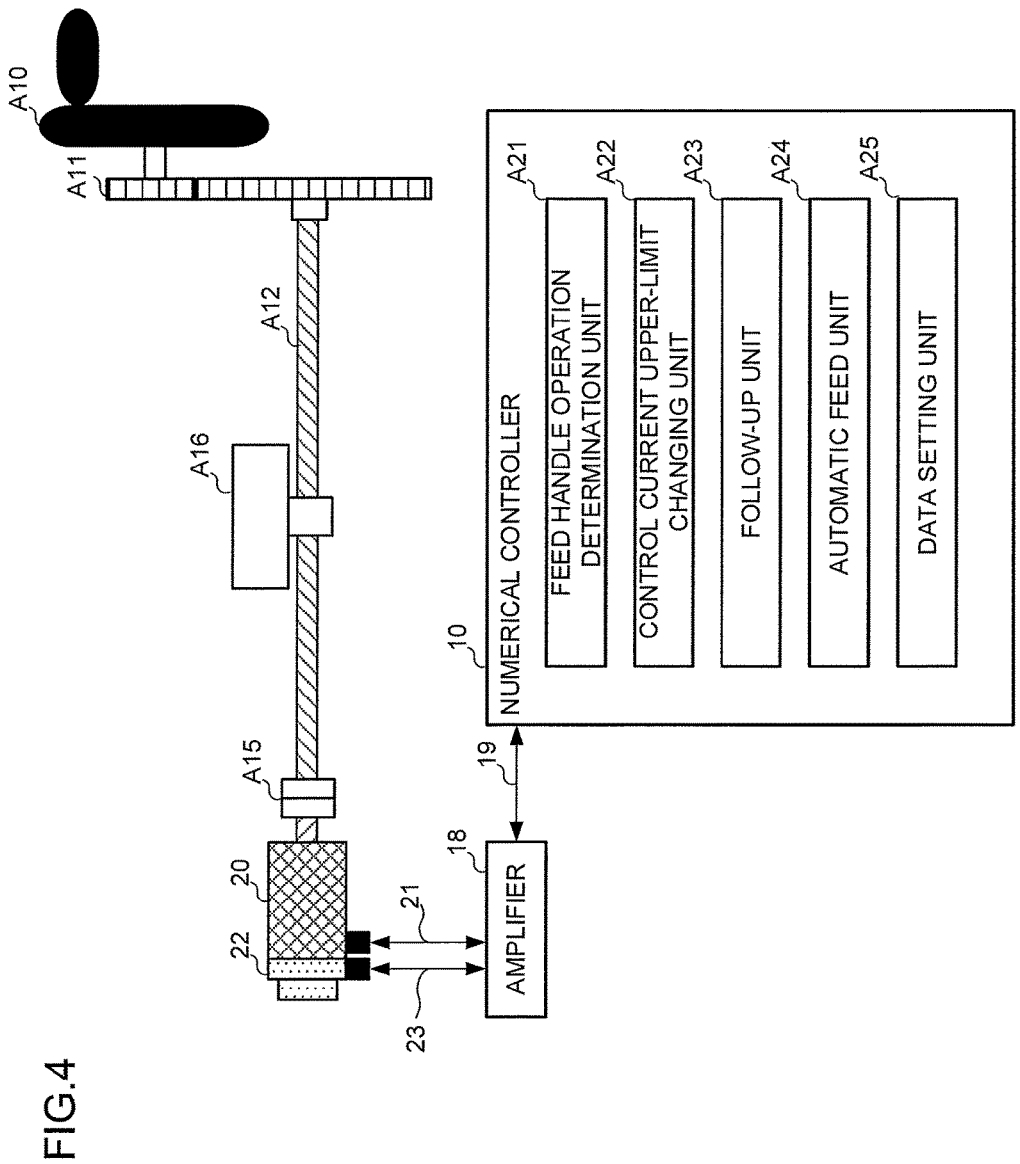

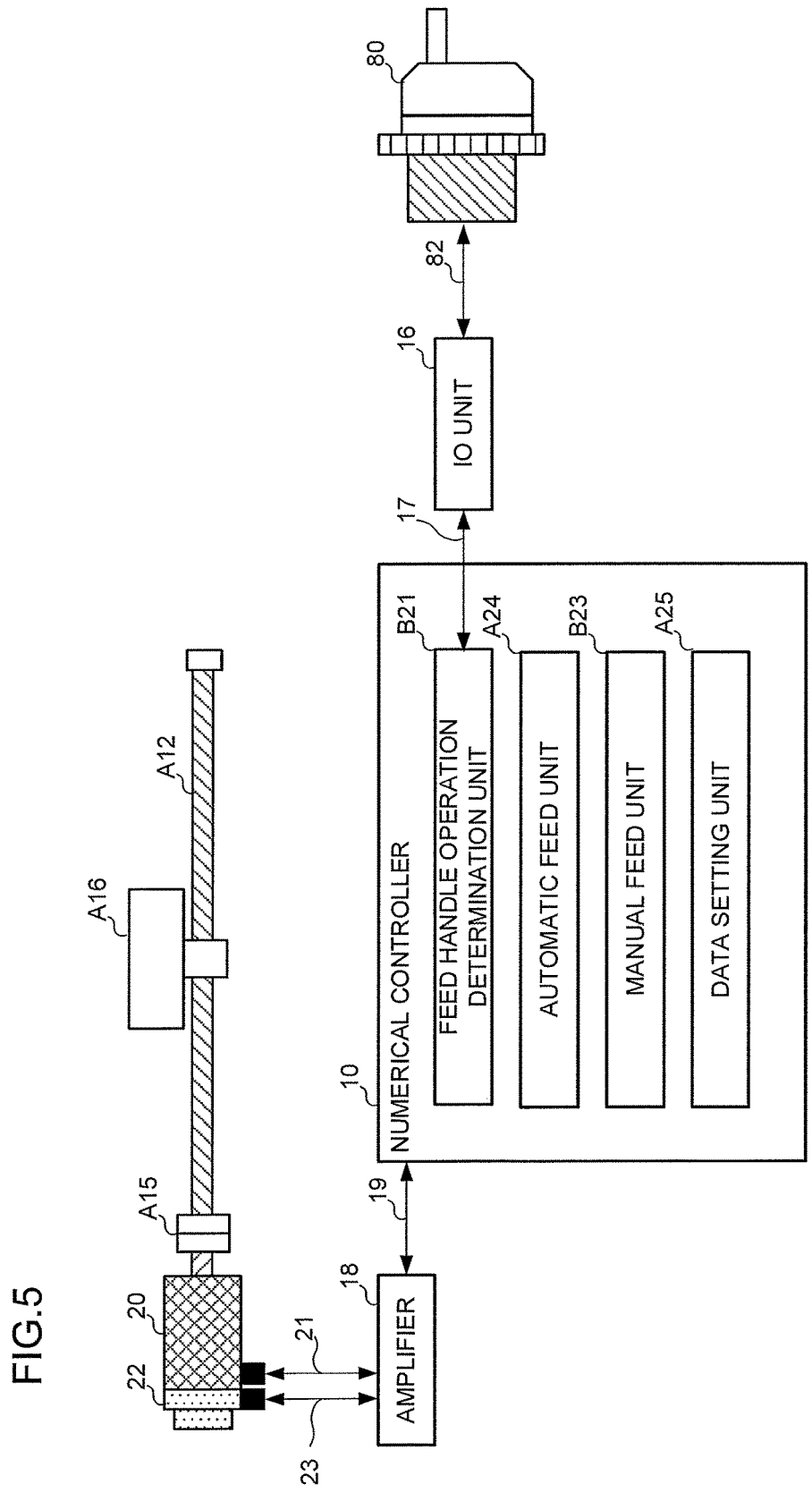

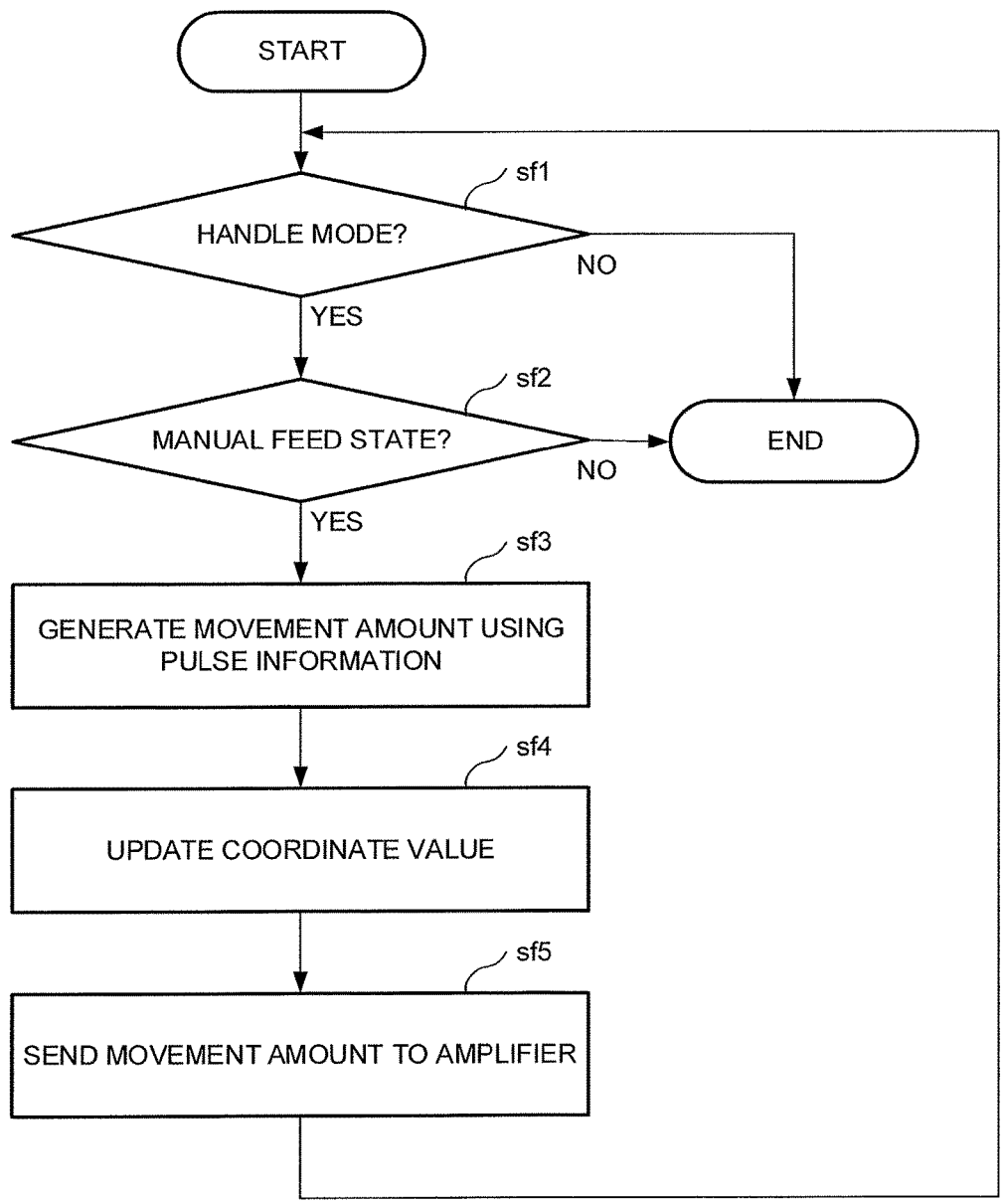

NUMERICAL CONTROLLER

BACKGROUND OF THE INVENTION

1. Field of the Invention

The present invention relates to a numerical controller, and more particularly, to a numerical controller that performs automatic feed control based on a handle operation in a machine tool that includes a mechanical feed handle or a manual pulse generator-type handle.

2. Description of the Related Art

A machine tool with a numerical controller including a feed handle for operating a slide that moves a tool or a workpiece is known. FIG. 1 illustrates an example of such a system.

This machine tool 1 includes a mechanical handle or a manual pulse generator-type handle as a feed handle 3. The mechanical handle is configured such that the feed handle 3 is connected to a feed mechanism (not illustrated) of the machine tool 1 with a gear interposed therebetween. That is, the mechanical handle can be said to be a mechanism similar to an engine lathe or a milling machine used when an operator machines a workpiece manually. On the other hand, the manual pulse generator-type handle outputs pulse information corresponding to a rotation angle. The manual pulse generator-type handle is used in a state of being connected to a numerical controller 10, and the numerical controller 10 performs control of moving a slide 4 according to a handle operation.

In such a system, it is generally possible to execute both manual machining (a handle mode) which uses the feed handle 3 and automatic machining which uses a machining program by switching the mode of the numerical controller 10. In FIG. 1, reference numeral 20 denotes a motor, reference numeral 7 denotes a tool, and reference numeral 5 denotes a workpiece.

In general, when a plurality of same workpieces is machined, it may be efficient to create a machining program for a numerical controller to perform machining automatically. On the other hand, when a single workpiece is machined, it may be faster for an experienced operator to machine the workpiece (that is, to machine the workpiece manually using a feed handle) than automatic machining. Due to this, a machine tool with a numerical controller including the mechanical handle or the manual pulse generator-type handle is often provided.

The feed handle generally has a large reduction ratio in relation to a feed axis and has a small mount of feed per rotation angle of a handle in order to realize minute feed and positioning during manual machining. Due to this, in order to feed long stroke, for example, when a tool is released from the workpiece, it is necessary to continuously rotate the handle several times.

In order to obviate this, conventionally, when it is necessary to feed long stroke, an operator switches the mode of a numerical controller to a jog feed mode or a MDI program mode to release a slide using a jog feed button or a program command.

Japanese Patent Application Laid-Open No. 4-348843 discloses a technique in which a dedicated handle (lever) is provided in a machine tool so that long stroke can be fed continuously by an operator operating this lever.

However, in a method of switching the mode of the numerical controller, since the operator needs to operate the numerical controller, there is a problem that the operation efficiency deteriorates for an inexperienced operator. In this respect, although the configuration disclosed in Japanese Patent Application Laid-Open No. 4-348843 has an advantage that the operator is not aware of the mode switching of the numerical controller, there is another problem that the cost for providing the dedicated lever in the machine tool is necessary.

SUMMARY OF THE INVENTION

The present invention has been made to solve such a problem, and an object thereof is to provide a numerical controller capable of performing, automatic feed by an easy and intuitive operation without requiring an additional device.

A first aspect of a numerical controller according to the present invention provides a numerical controller controlling a machine tool by generating an automatic feed command for driving a motor, the machine tool including a drive shaft for moving a tool and a workpiece relatively, a feed handle for driving the drive shaft by using a mechanical mechanism, and the motor for driving the drive shaft, the numerical controller including: a feed handle operation determination unit that detects a specific handle operation performed on the feed handle; and an automatic feed unit that generates the automatic feed command when the specific handle operation is detected.

A second aspect of a numerical controller according to the present invention provides a numerical controller controlling a machine tool by generating an automatic feed command for driving a motor, the machine tool including a drive shaft for moving a tool and a workpiece relatively, a manual pulse generator that generates a manual feed command on the basis of a rotation amount of a handle, and the motor for driving the drive shaft according to the manual feed command, the numerical controller including: a feed handle operation determination unit that detects a specific handle operation performed on the manual pulse generator; and an automatic feed unit that generates the automatic feed command when the specific handle operation is detected.

The specific handle operation may be an operation of rotating the handle at a predetermined speed in the same rotation direction and may be an operation of stopping the handle at a predetermined rotation angle within a predetermined period for a predetermined number of times.

A feed direction and a feed rate commanded by the automatic feed command may be a predetermined direction and a predetermined speed and may be calculated on the basis of a rotation direction and a rotation speed of the specific handle operation.

The feed handle operation determination unit may detect a second specific handle operation, and the automatic feed unit may stop generating the automatic feed command when the second specific handle operation is detected.

The numerical controller may further include a load detection unit that detects a load of the motor, and the automatic feed unit may stop generating the automatic feed command when a predetermined load is detected.

The second specific handle operation may be an operation of rotating the handle in an opposite direction to the feed direction under the automatic feed command.

According to the present invention, it is possible to provide a numerical controller capable of performing automatic feed by an easy and intuitive operation without requiring an additional device.

BRIEF DESCRIPTION OF THE DRAWINGS

FIG. 4 is a block diagram illustrating a logical configuration of the numerical controller according to Embodiment 1 of the present invention and an application example of the numerical controller 10.

FIG. 5 is a block diagram illustrating a logical configuration of the numerical controller according to Embodiment 2 of the present invention and an application example of the numerical controller 10.

FIG. 11 is a flowchart illustrating a process of a manual feed unit according to Embodiment 2 of the present invention.

DETAILED DESCRIPTION OF THE PREFERRED EMBODIMENTS

Figure 1:
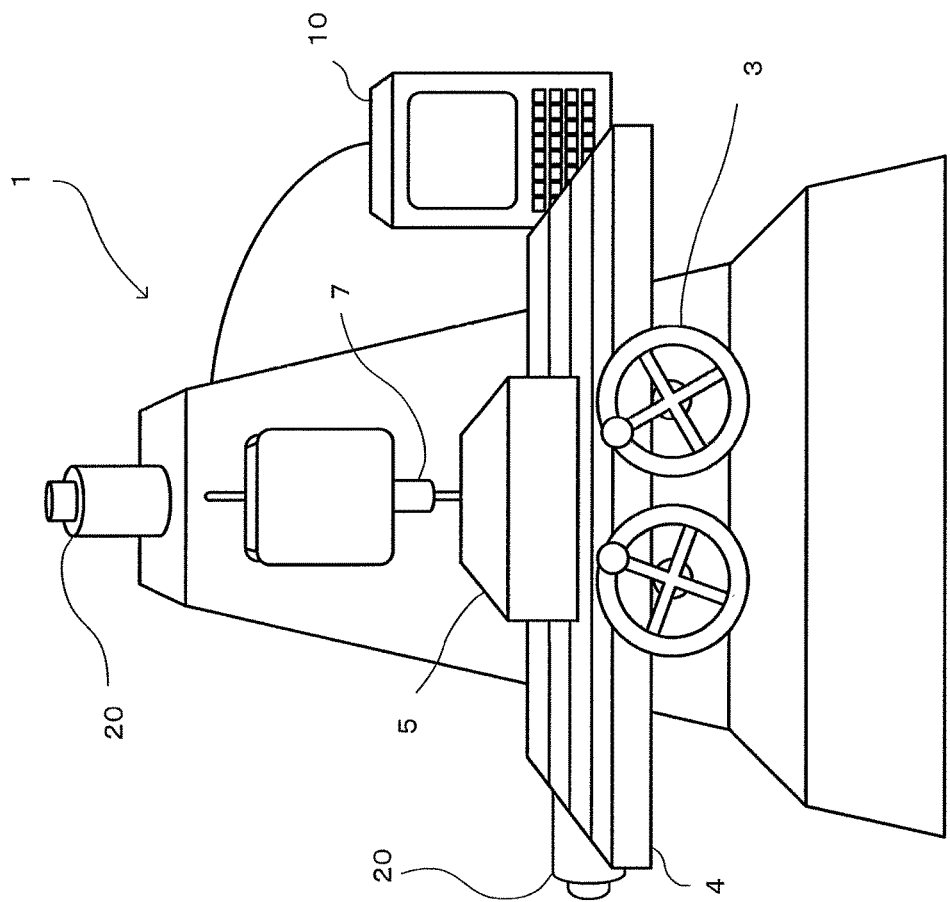
FIG. 1 is a diagram illustrating an example of a machine tool with a numerical controller including a conventional feed handle.

Hereinafter, embodiments of the present invention will be described using the drawings. The same or similar constituent elements will be described using the same reference numerals.

<Embodiment 1>

Figure 2:
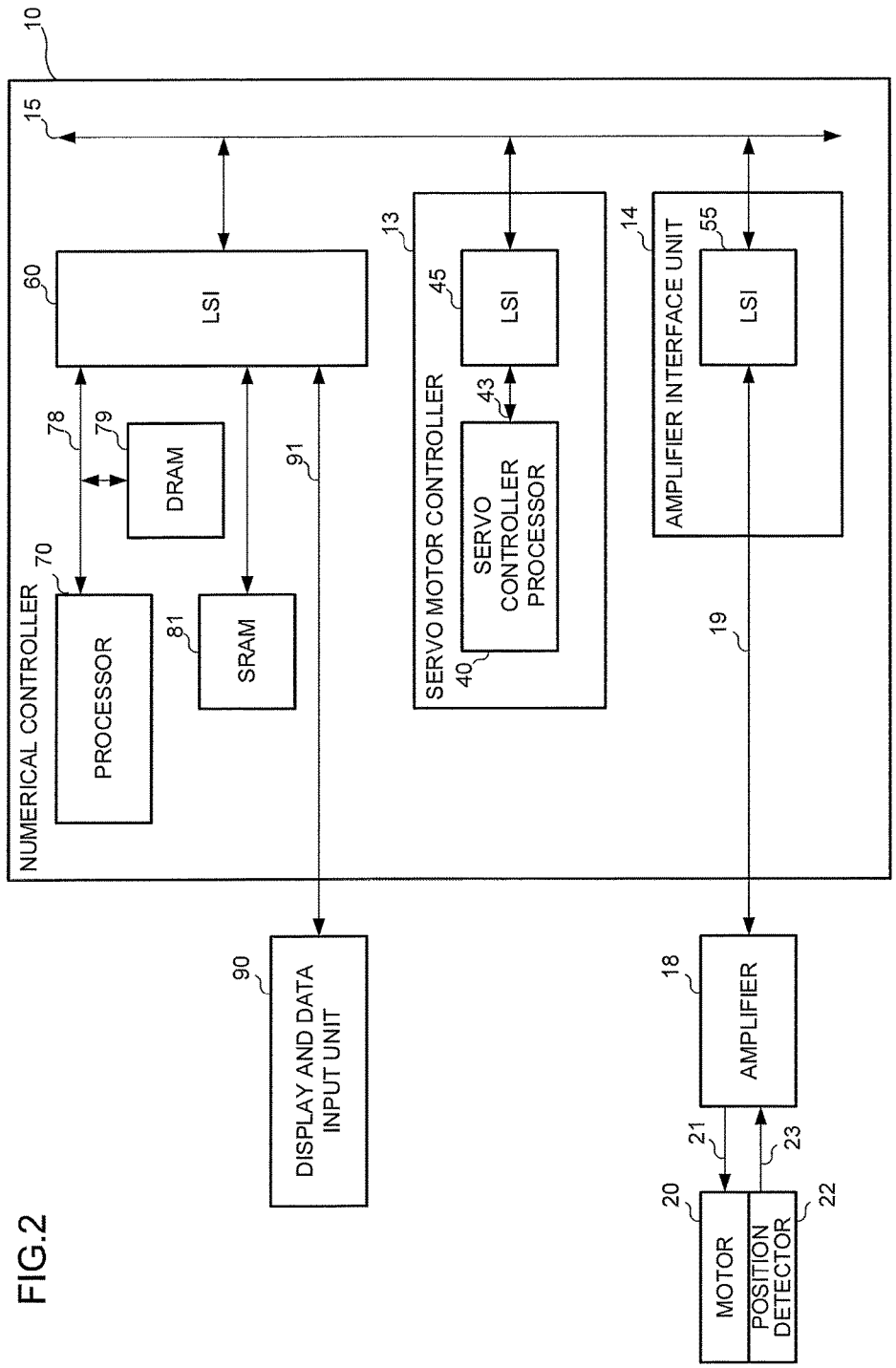
FIG. 2 is a block diagram illustrating a hardware configuration of a numerical controller according to Embodiment 1 of the present invention.

FIG. 2 is a block diagram illustrating an example of a hardware configuration of a numerical controller 10 according to Embodiment 1 of the present invention.

The numerical controller 10 includes an integration peripheral LSI 60, a processor 70, a DRAM 79, a SRAM 81, a servo motor controller 13, and an amplifier interface unit 14. The processor 70, the servo motor controller 13, and the amplifier interface unit 14 are connected to each other via an internal bus 15.

The processor 70 controls an entire operation of the numerical controller 10. The processor 70, the DRAM 79, and the integration peripheral LSI 60 are connected to each other via a bus 78. The SRAM 81 (retention-type memory) is connected to the integration peripheral LSI 60 via an internal bus.

A display and data input unit 90 displays information to a user and receives data input by the user. The display and data input unit 90 is connected to the integration peripheral LSI 60 via a serial bus 91. The servo motor controller 13 controls a servo motor for moving a tool 7 (see FIG. 1). The servo motor controller 13 includes a servo controller processor 40 and a peripheral control LSI 45. The servo controller processor 40 and the peripheral control LSI 45 are connected to each other via a bus 43.

The motor 20 provides drive force for operating a slide 4 (see FIG. 1). A position detector 22 detects a movement amount of the slide 4. The motor 20 is connected to an amplifier 18 via a power line 21, and the position detector 22 is connected to the amplifier 18 via a feedback cable 23. A motor control amplifier 18 is connected to the peripheral control LSI 55 of the amplifier interface unit 14 via the serial servo bus 19.

FIG. 4 is a block diagram illustrating an example of a logical configuration of the numerical controller 10 according to Embodiment 1 of the present invention and an application example of the numerical controller 10.

A logical configuration of the numerical controller 10 will be described. As illustrated in FIG. 4 the numerical controller 10 includes a feed handle operation determination unit A21, a control current upper-limit changing unit A22, a follow-up unit A23, an automatic feed unit A24, and a data setting unit A25. These units A21 to A25 are logical processing units implemented when the processor 70 executes a predetermined program and controls other hardware components.

An application example of the numerical controller 10 will be described. As illustrated in FIG. 4, the mechanical handle A10 having a mechanical mechanism is connected to a feed screw A12 which is a feed mechanism of a machine tool via a gear A11. The motor 20 and the position detector 22 are connected to the feed screw A12 via a coupling A15.

An operator operates the mechanical handle A10 by rotating the same with his or her hands so that the slide A16 (a tool or a workpiece) is fed. The rotation of the mechanical handle A10 is transmitted to the feed screw A12 via the gear A11 to move the slide A16. Moreover, the movement of the feed screw A12 is transmitted to the motor 20 and the position detector 22 via the coupling A15. The position detector 22 detects a movement amount (an amount of positional deviation) of the feed screw A12. The position detector 22 transmits the amount of positional deviation to the amplifier 18 via the feedback cable 23 as feedback information. The amplifier 18 transmits the amount of positional deviation to the numerical controller 10 via the serial servo bus 19.

The feed handle operation determination unit A21 outputs two states, a manual feed state and an automatic feed state, according to a determination condition to be described later. In an initial state of a handle mode, the feed handle operation determination unit A21 is set to a manual feed state.

The control current upper-limit changing unit A22 acquires a control current upper limit stored in advance in a memory by referring Lo the data setting unit A25 (in other words, a control current upper limit which is set to correspond to such torque that an operator can easily operate the mechanical handle A10). When the feed handle operation determination unit A21 is in a manual feed state, the control current upper-limit changing unit A22 sends the control current upper limit acquired from the data setting unit A25 to the amplifier 18 via the serial servo bus 19.

The follow-up unit A23 generates a follow-up amount using the amount of positional deviation received from the position detector 22 via the amplifier 18 and updates a coordinate value of a machine tool using the generated follow-up amount. Furthermore, the follow-up unit A23 sends the follow-up amount to the amplifier 18 via the serial servo bus 19 in order to cancel the amount of positional deviation.

The amplifier 18 converts the control current upper limit sent from the control current upper-limit changing unit A22 and the follow-up amount sent from the follow-up unit A23 to a control current to be supplied to a motor and supplies the control current to the motor 20 via the power line 21.

The feed handle operation determination unit A21 switches the feed state from a manual feed state to an automatic feed state when a specific handle operation is detected. The feed handle operation determination unit A21 monitors the amount of positional deviation received from the position detector 22 in the manual feed state. The feed handle operation determination unit A21 switches the feed state to the automatic feed state when it is determined, for instance, that conditions that the feed rate of the slide A16 fed by the mechanical handle A10 is equal to or larger than a continuous feed rate Vmax stored in advance in the memory, the slide A16 is fed in a fixed direction, and the slide A16 is continuously fed for a period To or longer stored in advance in the memory are satisfied.

In this way, it is possible to detect an operation of rotating the handle at a predetermined speed in the same rotation direction. Alternatively, the feed handle operation determination unit A21 may switch the feed state to the automatic feed state when an operation of the mechanical handle A10, satisfying an handle operation angle condition Ap, a stop count condition Np, and a time condition Tp stored in advance in the memory is detected. In this way, it is possible to detect an operation of stopping the handle a predetermined number of times at a predetermined rotation angle within a predetermined period. Here, the continuous feed rate Vmax, the elapsed time To, the angle condition Ap, the stop count condition Np, and the time condition Tp are typically stored in advance in the memory by the data setting unit A25.

The control current upper-limit changing unit A22 sends the "current value" stored in advance in the memory to the amplifier 18 via the serial servo bus 19 in the automatic feed state. The "current value" mentioned herein is a control current upper limit for obtaining torque sufficient for moving the slide according to automatic feed. Moreover, the "current value" used herein is typically stored in advance in the memory by the data setting unit A25.

The automatic feed unit A24 generates a movement amount for the automatic feed and sends the movement amount to the amplifier 18 via the serial servo bus 19. The amplifier 18 converts the control current upper limit sent from the control current upper-limit changing unit A22 and a movement command from the automatic feed unit 24 to a control current to be supplied to the motor and supplies the control current to the motor via the power line 21.

In this way, in the automatic feed state, the motor 20 rotates the feed screw A12 whereby the slide A16 is continuously fed. That is, when an operator performs a specific handle operation in the manual feed state, the feed state is switched to the automatic feed state, and the slide A16 performs feeding automatically even when an operator separates his or her hands from the mechanical handle A10.

Moreover, the feed handle operation determination unit A21 monitors the amount of positional deviation sent from the position detector 22 in the automatic feed state. The feed handle operation determination unit A21 detects force applied to the mechanical handle A10 in a direction opposite to the direction of the automatic feed. Specifically, it is possible to detect an operation of stopping the feed handle on the basis of a change in the amount of positional deviation and the sign of the amount of positional deviation. In this case, the feed handle operation determination unit A21 switches the feed state from the automatic feed state to the manual feed state. In this way, the automatic drive of the slide A16 by the motor 20 stops.

That is, when an operator performs an operation of applying force to stop the mechanical handle A10 in the course of the movement of the slide A16 according to the automatic feed, the feed state is switched to the manual feed state, and the automatic movement of the slide A16 stops.

Figure 6A:
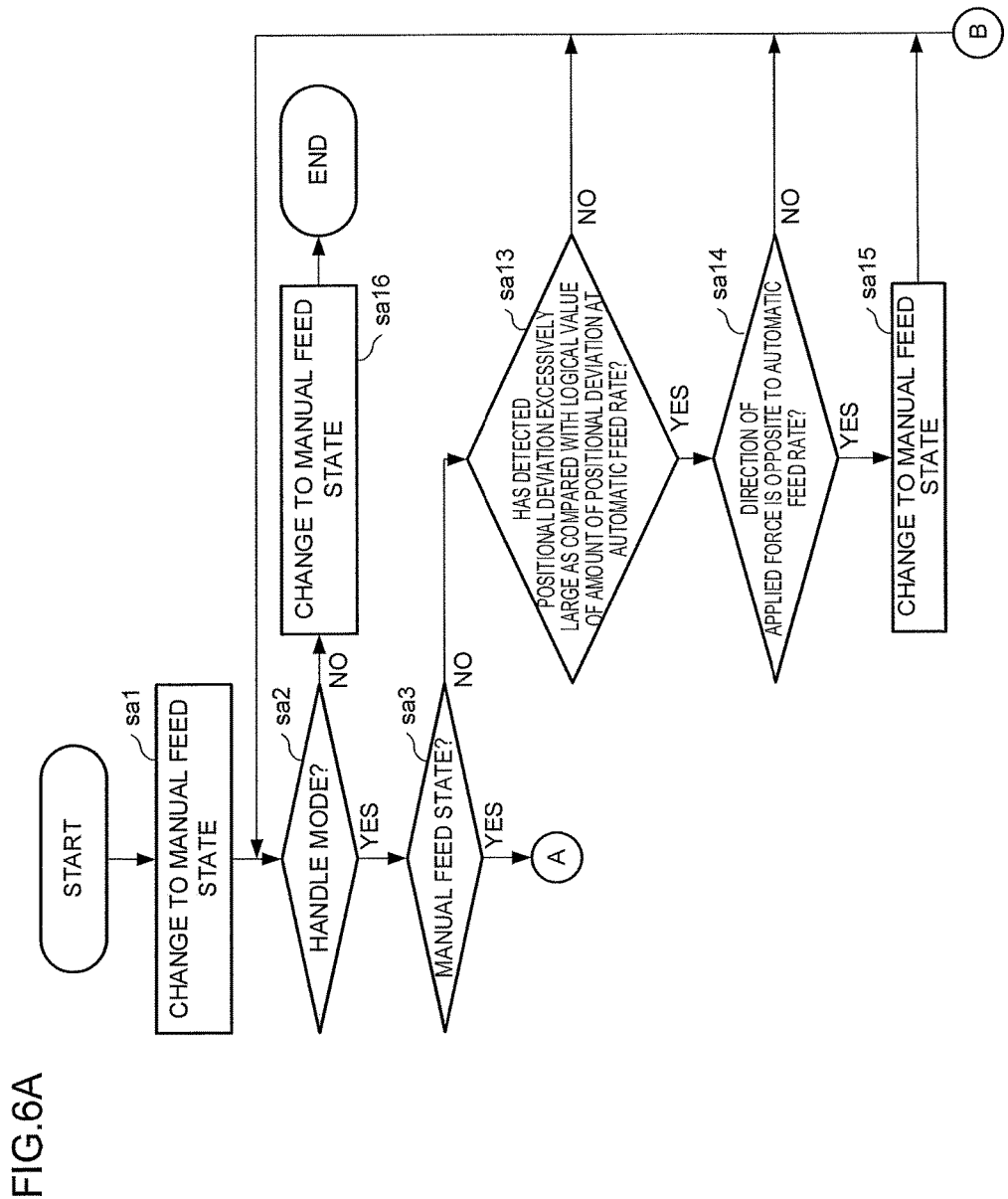
FIGS. 6A and 6B are flowcharts illustrating a process of a feed handle operation determination unit according to Embodiment 1 of the present invention.
Figure 6B:
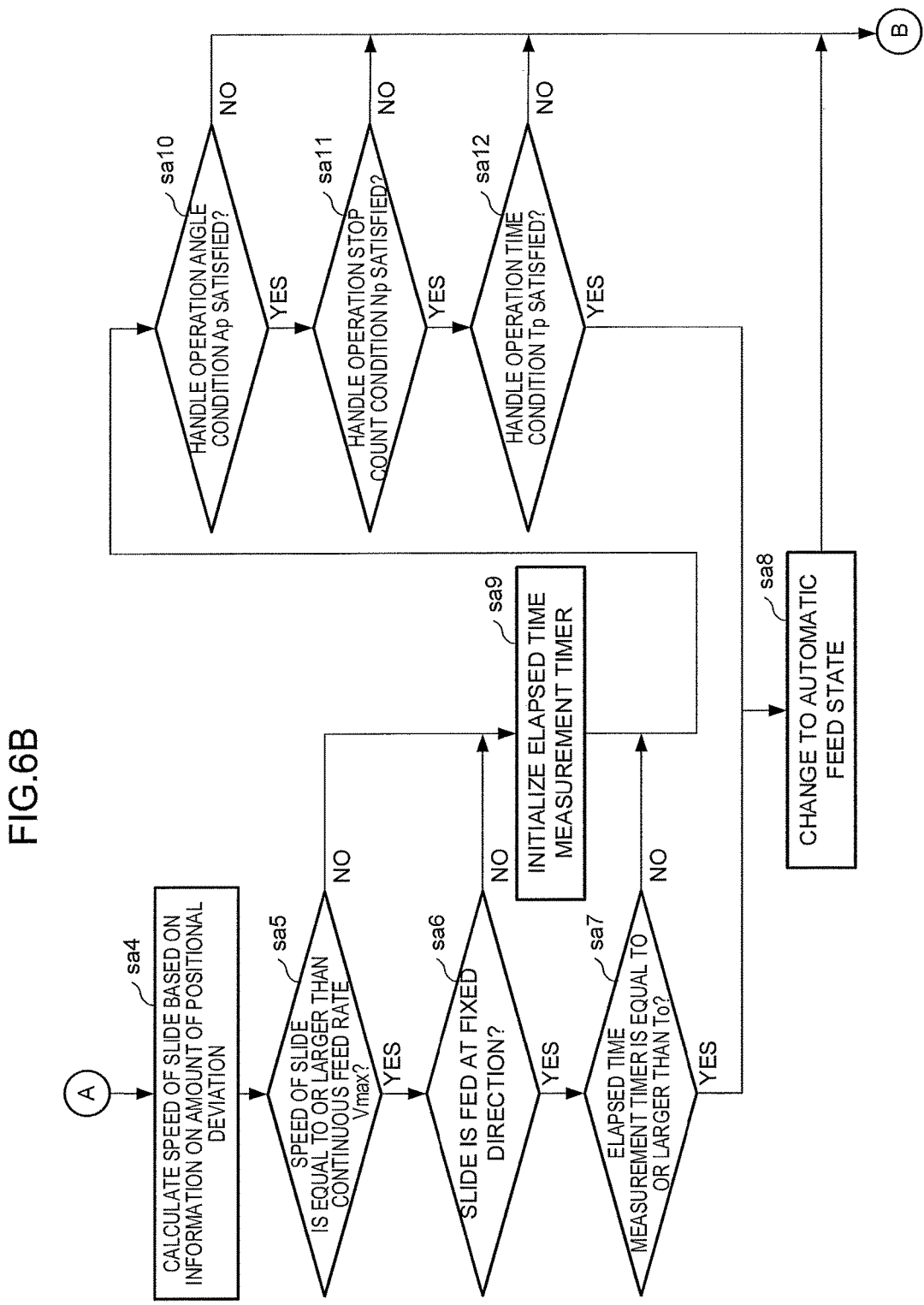

The operation of the feed handle operation determination unit A21 will be described with reference to the flowchart of FIGS. 6A and 6B.

First, the feed handle operation determination unit A21 sets the initial state to the manual feed state (step sa1). Subsequently, it is checked whether the handle mode is selected in the numerical controller 10 (step sa2). When the handle mode is set, it is checked whether the feed state is the manual feed state (step sa3). When the manual feed state is set, processes at step sa4 and subsequent steps are executed. On the other hand, when the manual feed state is not set (that is, the automatic feed state is set), step sa13 and the subsequent processes are executed.

When the manual feed state is set, the feed handle operation determination unit A21 calculates the feed rate of the slide A16 using the information of the amount of positional deviation (step sa4). It is checked whether the feed rate of the slide A16 is equal to or larger than the continuous feed rate Vmax (see step sg3 in FIG. 12A to be described later) stored in advance in the memory (step sa5). When the feed rate of the slide A16 is equal to or larger than Vmax, it is checked whether the slide A16 is fed in a fixed direction (step sa6). On the other hand, when the feed rate of the slide A16 is smaller than Vmax, an elapsed time measurement timer is initialized (step sa9) and processes at step sa10 and subsequent steps are executed.

When it is determined in step sa6 that the slide is fed in a fixed direction, it is checked whether the value of the elapsed time measurement timer is equal to or larger than To (see step sg9 in FIG. 12B to be described later) stored in advance in the memory (step sa7). When it is determined (step sa6) that the slide is not fed in a fixed direction, the elapsed time measurement timer is initialized (step sa9) and processes at step sa10 and subsequent steps are executed.

When it is determined (step sa7) that the value of the elapsed time measurement timer is equal to or larger than To stored in advance in the memory, the feed state is switched to the automatic feed state (step sa8) and the flow returns to a handle mode checking step (step sa2). When it is determined (step sa7) that the value of the elapsed time measurement timer is not equal to or larger than To stored in advance in the memory, processes at step sa10 and subsequent steps are executed. It is assumed that the elapsed time measurement timer always measures the time elapsed from the time point at which the timer was initialized.

The feed handle operation determination unit A21 checks whether the handle operation angle condition Ap (see step sg11 in FIG. 12B to be described later) is satisfied (step sa10). When the handle operation angle condition Ap is satisfied, it is checked whether the handle operation stop count condition Np (see step sg13 in FIG. 12C to be described later) is satisfied (step sa11). When the stop count condition Np is satisfied, it is checked whether the handle operation time condition Tp (see step sg15 in FIG. 12C to be described later) is satisfied (step sa12). When the handle operation time condition Tp is satisfied, the feed state is switched to the automatic feed state (step sa8) and the flow returns to a handle mode checking step (step sa2). When any one of the handle operation angle condition Ap, the stop count condition Np, and the time condition Tp is not satisfied, the flow returns to the handle mode checking step (step sa2).

When the manual feed state is not set in step sa3 (that is, the automatic feed state is set), the feed handle operation determination unit A21 calculates a theoretical value of the positional deviation at the automatic feed rate and checks whether the amount of positional deviation of the feedback information is excessively large as compared with the calculated theoretical value (step sa13). Typically, it is checked whether a difference between the theoretical value and the amount of positional deviation is equal to or larger than a predetermined threshold. When it is determined that the amount of positional deviation is excessively large, it is checked whether the direction of the force applied to the mechanical handle A10 is opposite to the direction of the automatic feed using the sign of the amount of positional deviation (step sa14). On the other hand, when it is determined that the amount of positional deviation is not excessively large (step sa13), the flow returns to the mode checking step (step sa2).

When it is determined in step sa14 that the direction of the force applied to the mechanical handle A10 is opposite to the direction of the automatic feed, the feed handle operation determination unit A21 switches the feed state to the manual feed state (step sa15). On the other hand, when the direction of the force applied to the mechanical handle A10 is not opposite to the direction of the automatic feed (step sa14), the flow returns to the mode checking step (step sa2). When it is determined (step sa2) that a mode other than the handle mode is selected, the feed state is switched to the manual feed state (step sa16) and this process ends.

Figure 7:
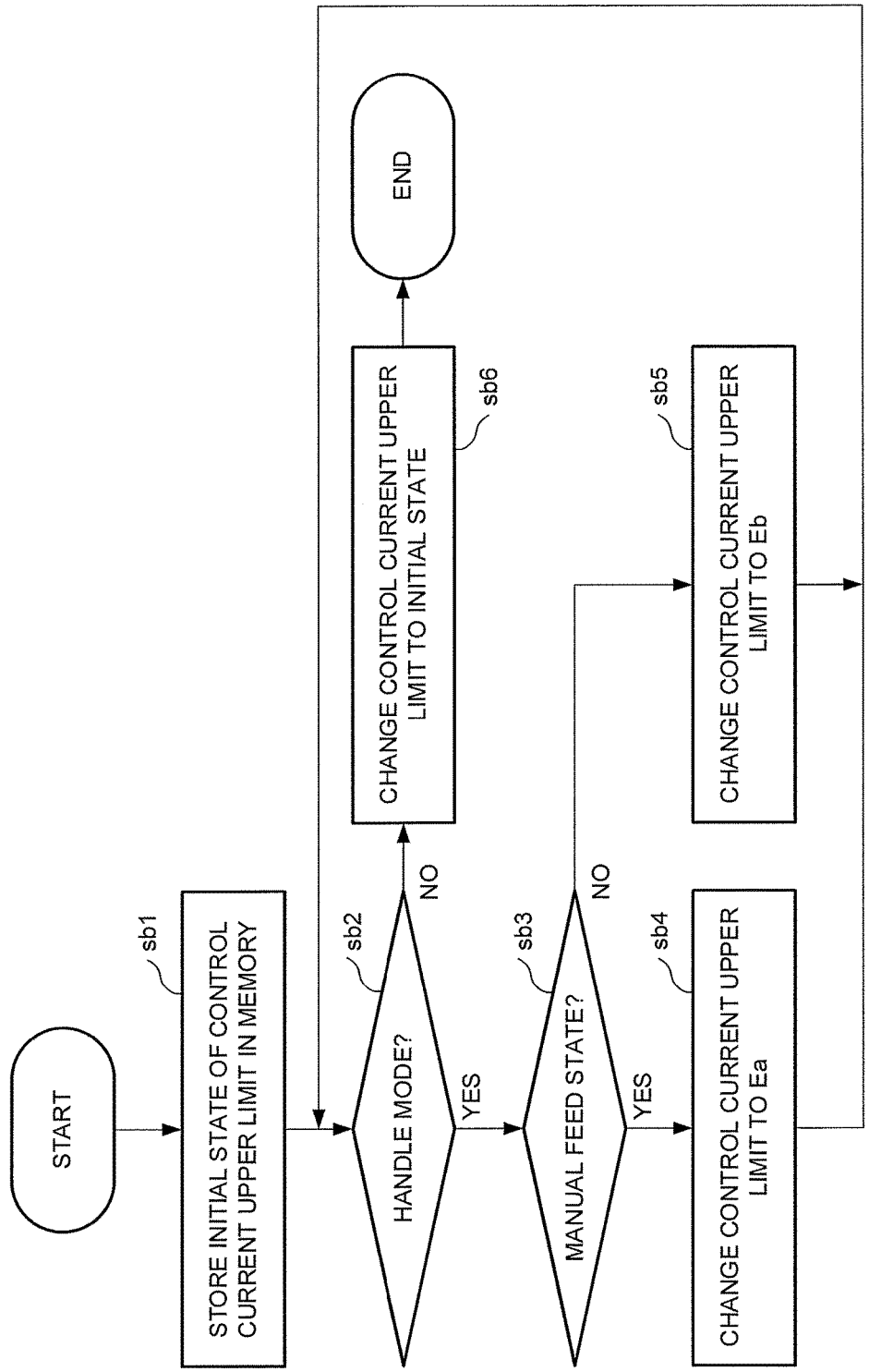
FIG. 7 is a flowchart illustrating a process of the control current upper-limit changing unit according to Embodiment 1 of the present invention.

The operation of the control current upper-limit changing unit A22 will be described with reference to the flowchart of FIG. 7.

First, the control current upper-limit changing unit A22 stores the value of the control current upper limit in the initial state in the memory (step sb1). Subsequently, it is checked whether the handle mode is selected (step sb2). When the handle mode is selected, it is checked whether the manual feed state is set (step sb3). When the manual feed state is set, the upper limit of the control current is changed to Ea (see step sg5 in FIG. 12A to be described later) stored in advance in the memory (step sb4). On the other hand, when the automatic feed state is set, the upper limit of the control current is changed to Eb (see step sg7 in FIG. 12B to be described later) set in advance (step sb5).

On the other hand, when the handle mode is not set in step sb2, the control current upper-limit changing unit A22 changes the upper limit of the control current to the value in the initial state, stored in the memory in step sb1, and this process ends.

Figure 8:
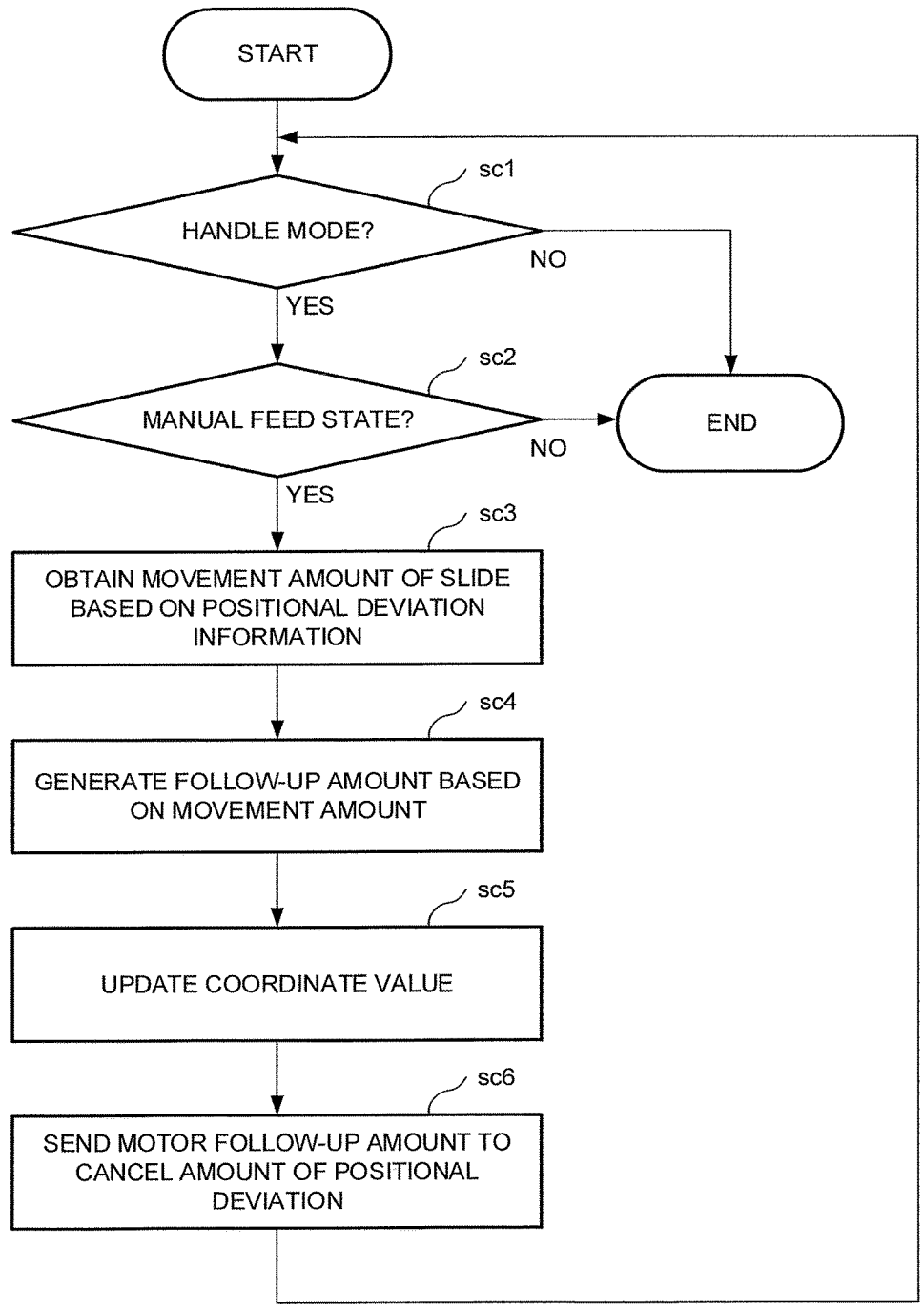
FIG. 8 is a flowchart illustrating a process of a follow-up unit according to Embodiment 1 of the present invention.

The operation of the follow-up unit A23 will be described with reference to the flowchart of FIG. 8.

First, the follow-up unit A23 checks whether the handle mode is selected (step sc1). When the handle mode is selected, it is checked whether the manual feed state is selected (step sc2). When the manual feed state is set, a process of obtaining (step sc3) the movement amount of the slide A16 on the basis of the amount of positional deviation, generating (step sc4) the follow-up amount on the basis of the obtained movement amount, updating (step sc5) the coordinate value, and canceling (step sc6) the amount of positional deviation by sending the follow-up amount of the motor is performed repeatedly.

On the other hand, when it is checked in step sc2 that the automatic feed state is set or a mode other than the handle mode is selected in step sc1, this process ends.

Figure 9:
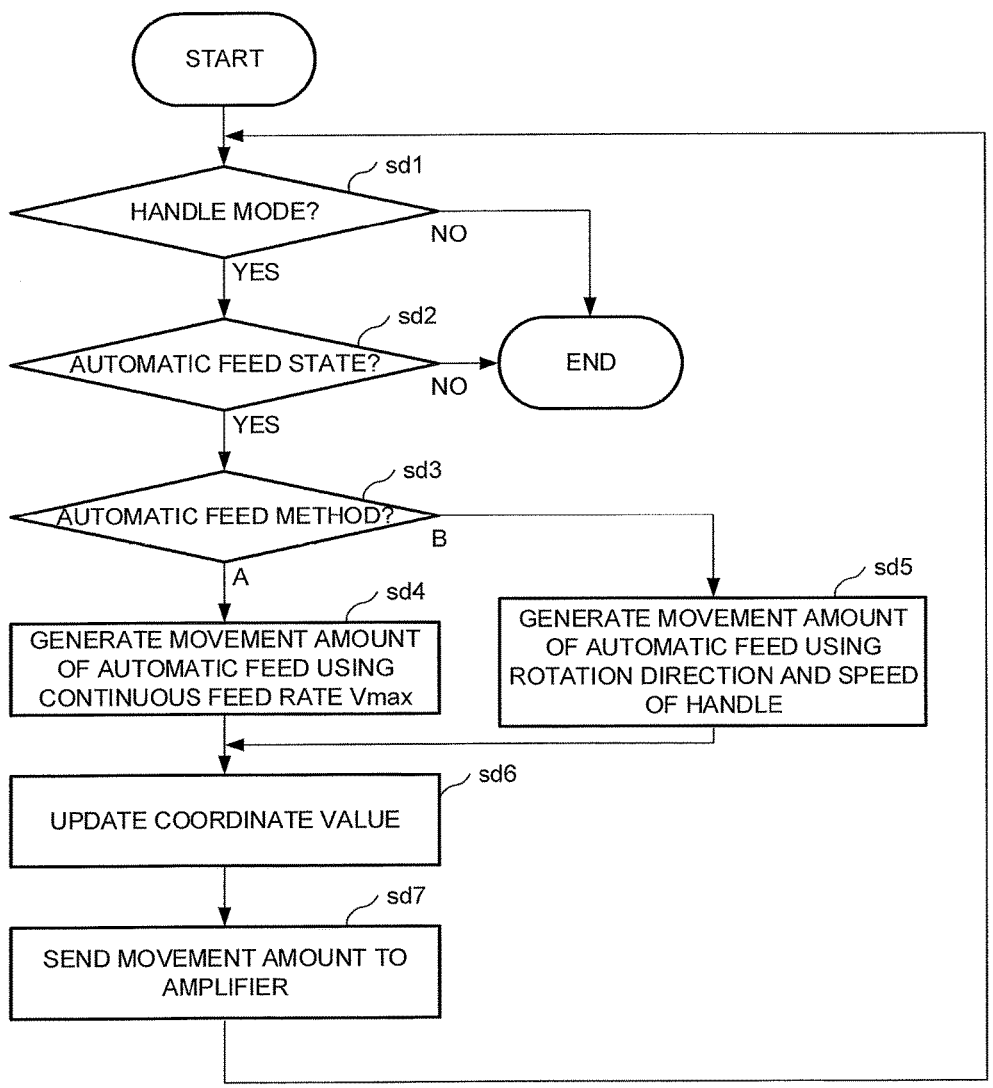
FIG. 9 is a flowchart illustrating a process of an automatic feed unit according to Embodiments 1 and 2 of the present invention.

The operation of the automatic feed unit A24 will be described with reference to the flowchart of FIG. 9.

First, the automatic feed unit A24 checks whether the handle mode is selected (step sd1). When the handle mode is selected, it is checked whether the automatic feed state is selected (step sd2). When the automatic feed state is selected, an automatic feed method is checked (step sd3). Here, when "A" is selected as the automatic feed method, the movement amount of the automatic feed is generated using the value of the continuous feed rate Vmax stored in advance in the memory (step sd4). On the other hand, when "B" is selected as the automatic feed method, the movement amount of the automatic feed is generated using the rotation direction and the speed of the handle (step sd5). Subsequently, a process of updating (step sd6) the coordinate value using the generated movement amount and sending (step sd7) the movement amount to the amplifier is performed repeatedly.

On the other hand, when the handle mode is not selected in step sd1 or the manual feed state is set in step sd2, this process ends.

Figure 12A:
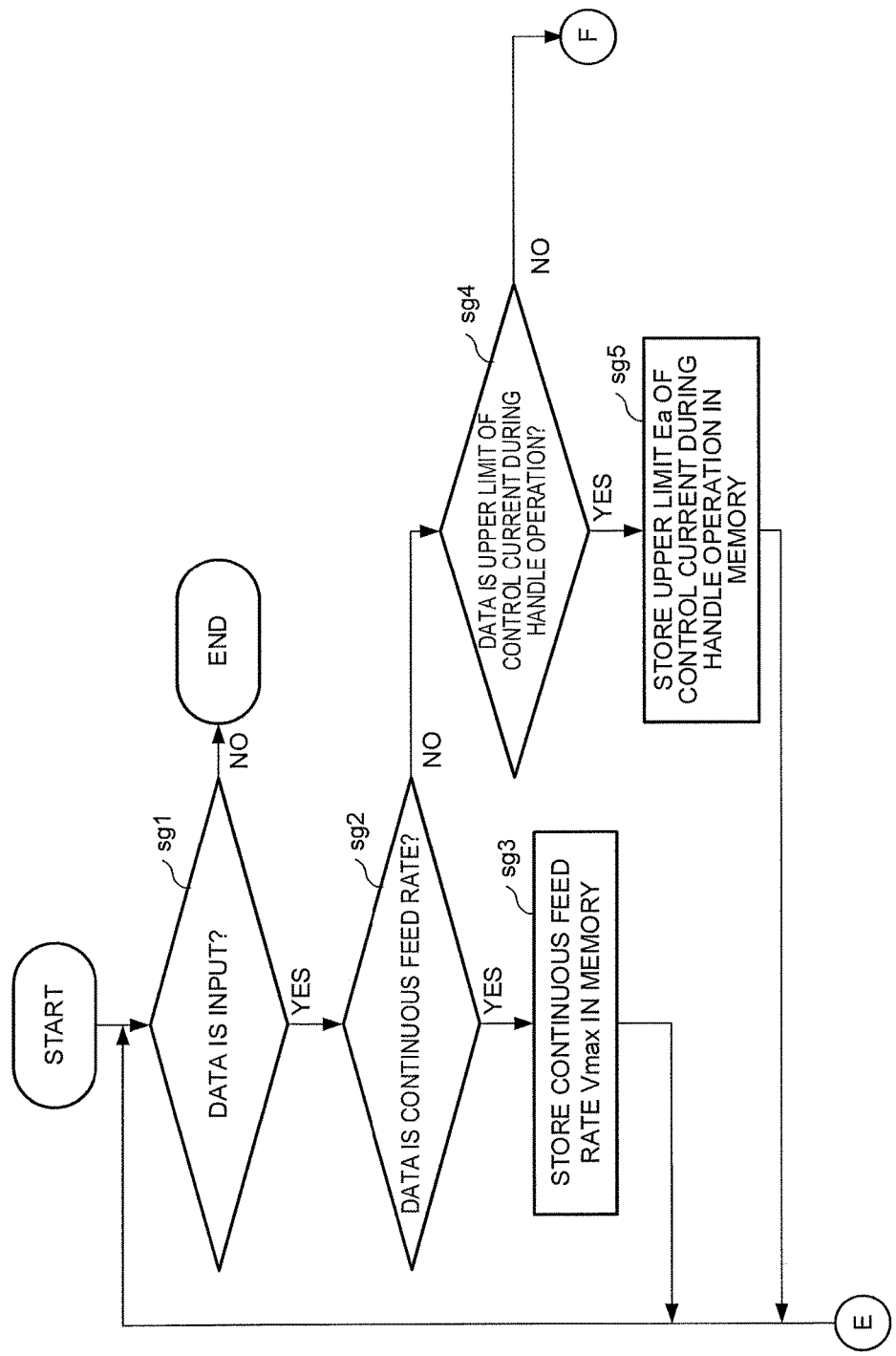
FIGS. 12A, 12B and 12C are flowcharts illustrating a process of a data setting unit according to Embodiments 1 and 2 of the present invention.
Figure 12B:
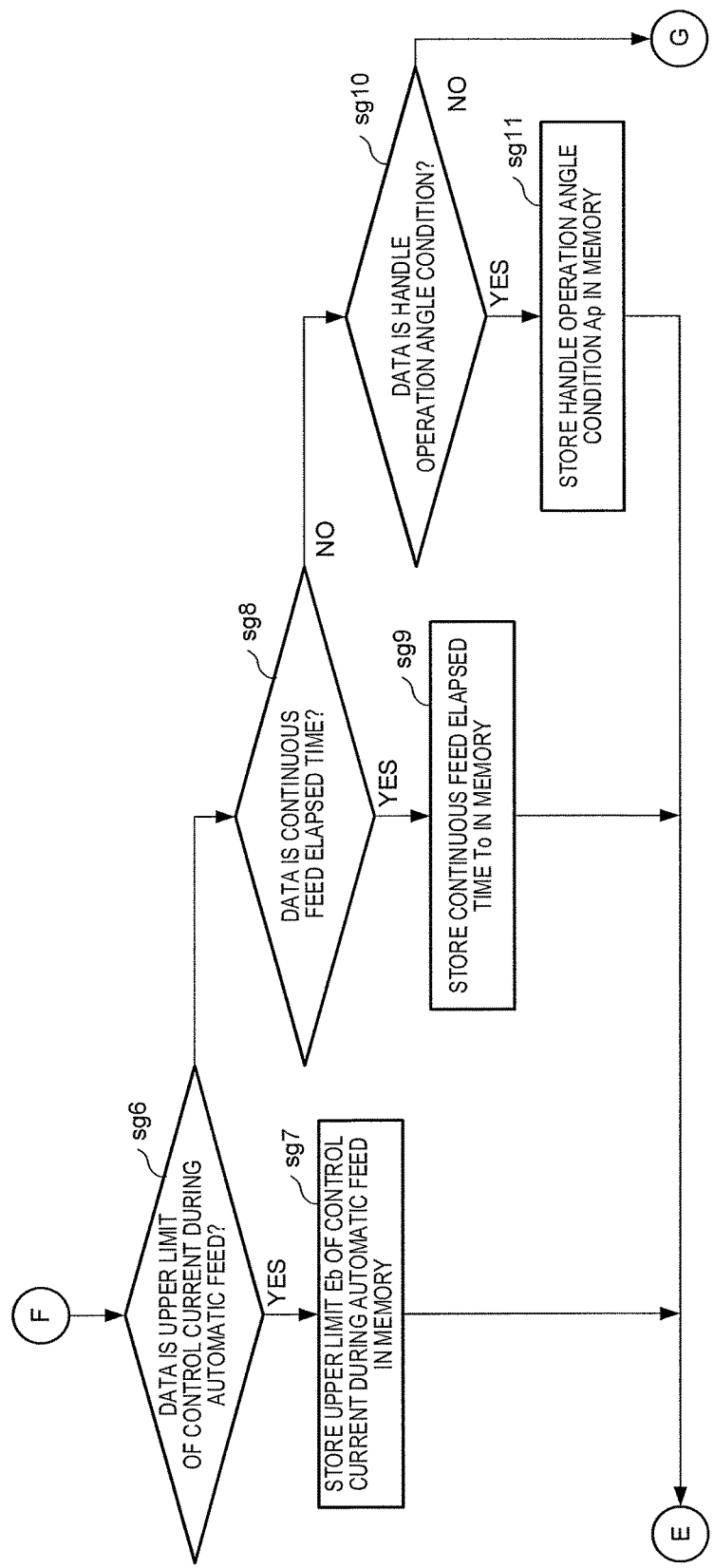
Figure 12C:
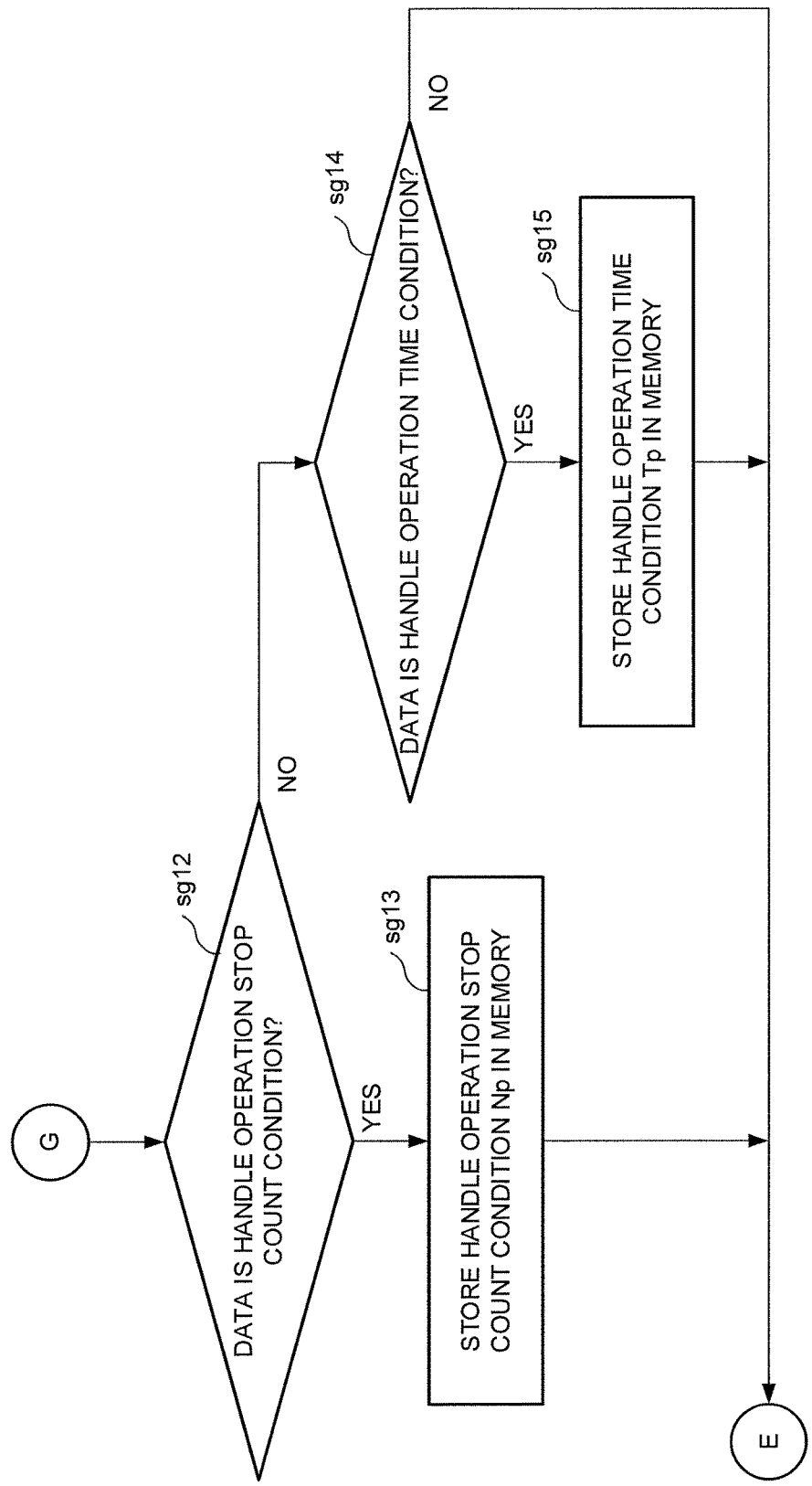

The operation of the data setting unit A25 will be described with reference to the flowcharts of FIGS. 12A, 12B, and 12C.

First, the data setting unit A25 checks whether data is input from the numerical controller 10 (step sg1). When the input data is a continuous feed rate (step sg2), the input data is stored in the memory as the continuous feed rate Vmax (step sg3). On the other hand, when the input data is the control current upper limit during the handle operation (step sg4), the input data is stored in the memory as the control current upper limit Ea during the handle operation (step sg5). When the input data is the control current upper limit during the automatic feed (step sg6), the input data is stored in the memory as the control current upper limit Eb during the automatic feed (step sg7). When the input data is a continuous feed elapsed time (step sg8), the input data is stored in the memory as the continuous feed elapsed time To (step sg9). When the input data is a handle operation angle condition (step sg10), the input data is stored in the memory as the handle operation angle condition Ap (step sg11). When the input data is the stop count condition of the handle operation (step sg12), the input data is stored in the memory as the stop count condition Np of the handle operation (step sg13). When the input data is a time condition of the handle operation (step sg14), the input data is stored in the memory as the time condition Tp of the handle operation (step sg15).

According to Embodiment 1 of the present invention, when the feed handle operation determination unit A21 detects a specific operation on the mechanical handle A10, the automatic feed unit A24 moves the slide so that the tool and the workpiece automatically move relatively. In this way, the operator can perform automatic feed with an easy and intuitive operation. Moreover, since a special apparatus such as a dedicated handle is not required, it is possible to add an automatic feed mechanism to the numerical controller 10 at a low cost.

<Embodiment 2>

Figure 3:
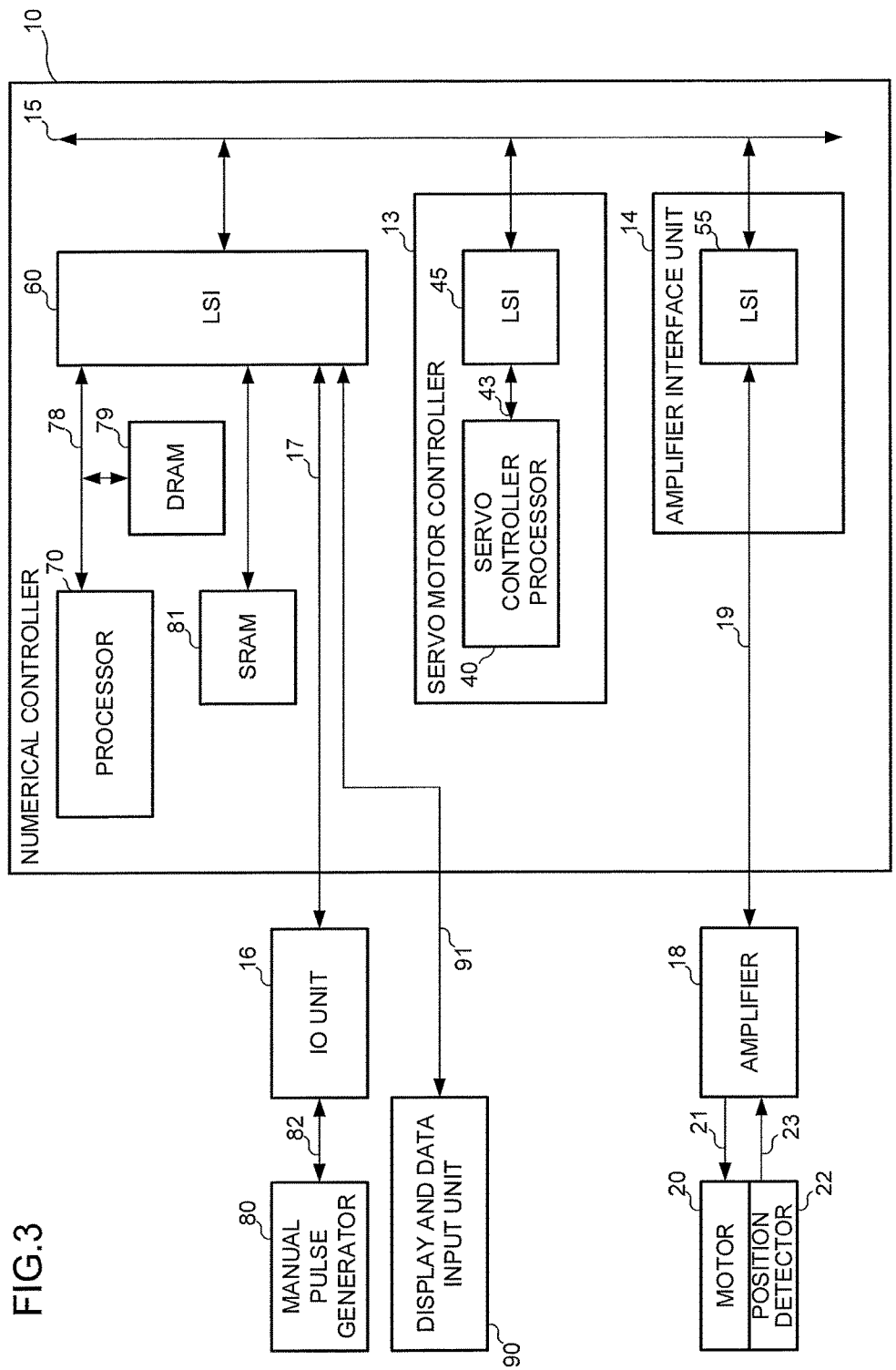
FIG. 3 is a block diagram illustrating a hardware configuration of a numerical controller according to Embodiment 2 of the present invention.

FIG. 3 is a block diagram illustrating an example of a hardware configuration of the numerical controller 10 according to Embodiment 2 of the present invention. In Embodiment 2, the numerical controller 10 further includes a manual pulse generator 80 and an IO unit 16 in addition to the constituent elements (see FIG. 2) of Embodiment 1.

The manual pulse generator 80 is connected to the IO unit 16 via an IO cable 82. The TO unit 16 is connected to the integration peripheral LSI 60 of the numerical controller 10 via a field bus 17.

FIG. 5 is a block diagram illustrating an example of a logical configuration of the numerical controller 10 according to Embodiment 2 of the present invention and an application example of the numerical controller 10.

A logical configuration of the numerical controller 10 according to Embodiment 2 will be described. As illustrated in FIG. 5, the numerical controller 10 includes a feed handle operation determination unit B21, the automatic feed unit A24, a manual feed unit B23, and the data setting unit A25. The units B21 and B23 are logical processing units implemented when the processor 70 executes a predetermined program and controls other hardware components.

An application example of the numerical controller 10 according to Embodiment 2 will be described. As illustrated in FIG. 5, a handle (the manual pulse generator 80) operated by the operator is connected to the numerical controller 10 via the IO cable 82, the IO unit 16, and the field bus 17. When the operator performs an operation of rotating the handle of the manual pulse generator 80, pulse information is output from the manual pulse generator 80, and the pulse information is sent to the numerical controller 10 via the above-described connection route.

The feed handle operation determination unit B21 also outputs two states, a manual feed state and an automatic feed state, according to the determination condition to be described later. In an initial state of a handle mode, the feed handle operation determination unit B21 is set to a manual feed state.

In the manual feed state, the manual feed unit B23 generates a movement amount on the basis of the pulse information and sends the movement amount to the amplifier 18 via the serial servo bus 19. The amplifier 18 converts the received movement amount command to a control current and drives the motor 20 via the power line 21. The motor 20 is connected to the feed screw A12 for feeding the slide A16 by the coupling A15, and the slide A16 can be moved when the motor 20 rotates.

The feed handle operation determination unit B21 switches the feed state from the manual feed state to the automatic feed state when a specific handle operation is detected. The feed handle operation determination unit B21 monitors the pulse information received from the manual pulse generator 80 in the manual feed state. The feed handle operation determination unit B21 switches the feed state to the automatic feed state when it is determined, for instance, that conditions that the pulse information is equal to or larger than a continuous feed rate Vmax stored in advance in the memory, the feed direction is a fixed direction, and the manual pulse generator 80 is rotated continuously for a period To or longer stored in advance in the memory are satisfied. In this case, an operation of rotating the handle at a predetermined speed in the same rotation direction is detected. Alternatively, the feed handle operation determination unit B21 may switch the feed state to the automatic feed state when the pulse information satisfies an handle operation angle condition Ap, a stop count condition Np, and a time condition Tp stored in advance in the memory. In this case, an operation of stopping the handle a predetermined number of times at a predetermined rotation angle within a predetermined period is detected.

In the automatic feed state, the automatic feed unit A24 generates a movement amount of the automatic feed and sends the movement amount to the amplifier 18 via the serial servo bus 19. The amplifier 18 converts the received movement amount command to a control current and drives the motor 20 via the power line 21. The motor 20 is connected to the feed screw A12 for feeding the slide A16 by the coupling A15, and it is possible to move the slide A16 at the continuous feed rate Vmax when the motor 20 rotates.

In this way, in the automatic feed state, the automatic feed is continued even if the handle of the manual pulse generator 80 is not rotated.

The feed handle operation determination unit B21 also monitors the pulse information in the automatic feed state. The feed handle operation determination unit B21 switches the feed state from the automatic feed state to the manual feed state when pulse information of the direction opposite to the direction of the automatic feed is detected. In this way, the drive of the slide A16 by the motor 20 stops.

That is, when an operator rotates the manual pulse generator 80 in the direction opposite to the direction of the automatic feed in the course of the movement of the slide A16 according to the automatic feed, the feed state is switched to the manual feed state and the automatic movement of the slide A16 stops.

Figure 10A:
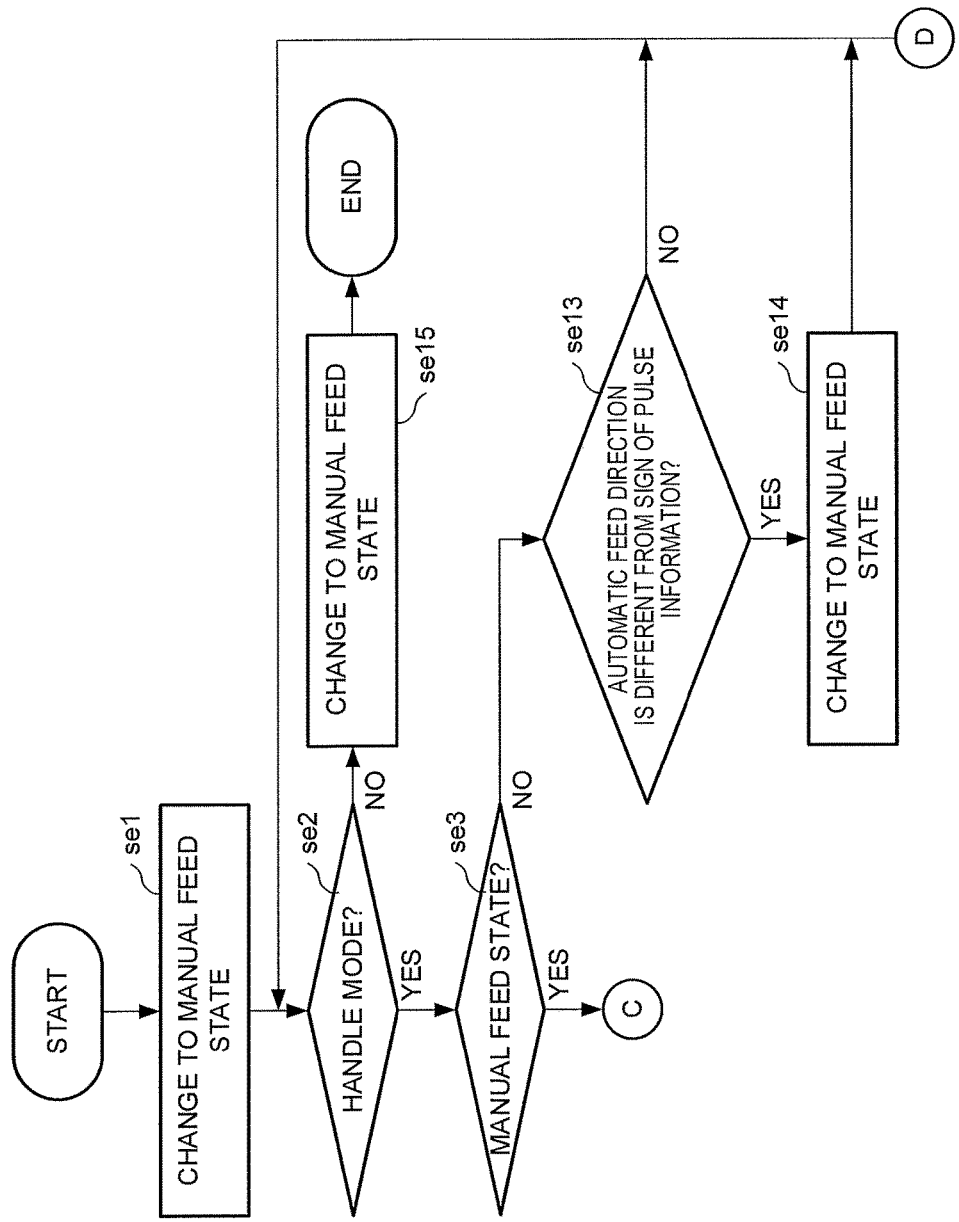
FIGS. 10A and 10B are flowcharts illustrating a process of the feed handle operation determination unit according to Embodiment 2 of the present invention.
Figure 10B:
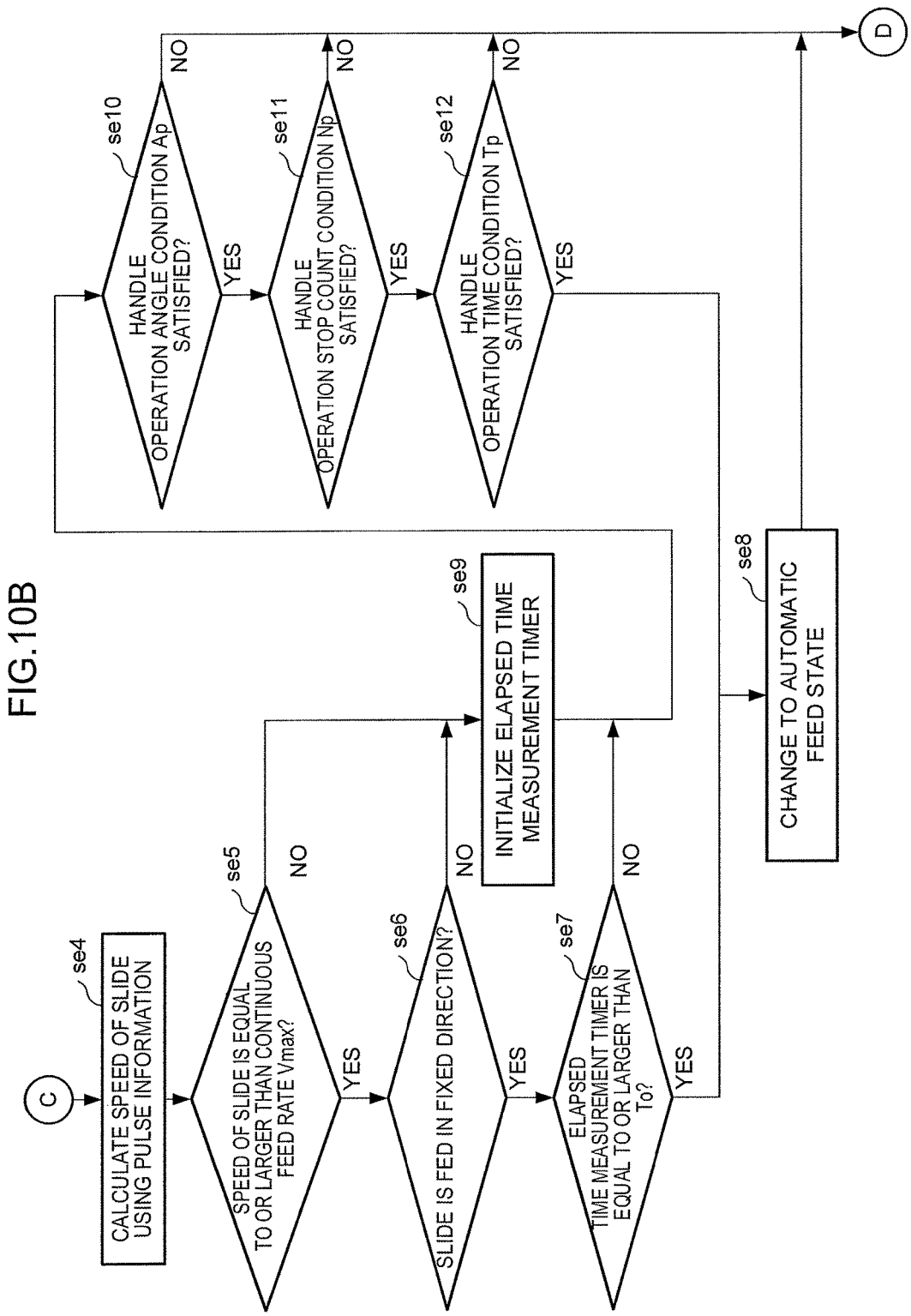

The operation of the feed handle operation determination unit B21 will be described with reference to the flowchart of FIGS. 10A and 10B.

First, the feed handle operation determination unit B21 sets the initial state to the manual feed state (step se1). Subsequently, it is checked whether the handle mode is selected (step se2). When the handle mode is set, it is checked whether the manual feed state is set (step se3). When the manual feed state is set, processes at step se4 and subsequent steps are executed.

When the manual feed state is set, the feed handle operation determination unit B21 calculates the feed rate of the slide A16 using the pulse information from the manual pulse generator 80 (step se4). Subsequently, it is checked whether the feed rate of the slide A16 is equal to or larger than the continuous feed rate Vmax stored in advance in the memory (step se5). When the feed rate of the slide A16 is equal to or larger than the continuous feed rate Vmax, it is checked whether the slide A16 is fed in a fixed direction (step se6).

When the feed rate of the slide A16 is not equal to or larger than the continuous feed rate Vmax stored in advance in the memory (step se5) or the slide is not fed in a fixed direction (step se6), the elapsed time measurement timer is initialized (step se9) and the flow proceeds to step se10.

On the other hand, when the slide A16 is fed in a fixed direction (step se6), it is checked whether the value of the elapsed time measurement timer is equal to or larger than To stored in advance in the memory (step se7). When the value of the elapsed time measurement timer is equal to or larger than To, the feed state is switched to the automatic feed state (step se8) and the flow returns to step se2 (handle mode checking step). On the other hand, when the value of the elapsed time measurement timer is not equal to or larger than To, the flow proceeds to step se10.

The feed handle operation determination unit B21 checks whether the handle operation angle condition Ap (see step sg11 in FIG. 12B to be described later) is satisfied (step se10). When the handle operation angle condition Ap is satisfied, it is checked whether the handle operation stop count condition Np (see step sg13 in FIG. 12C to be described later) is satisfied (se11). When the stop count condition Np is satisfied, it is checked whether the handle operation time condition Tp (see step sg15 in FIG. 12C to be described later) is satisfied (step se12). When the handle operation time condition Tp is satisfied, the feed state is switched to the automatic feed state (step se8) and the flow returns to step se2 (a handle mode checking step). When any one of the handle operation angle condition Ap, the stop count condition Np, and the time condition Tp is not satisfied, the flow returns to step se2 (the handle mode checking step).

When the manual feed state is not set in step se3 (that is, the automatic feed state is set), the feed handle operation determination unit B21 checks whether the direction of the automatic feed is different from the sign of the pulse information from the manual pulse generator (step se13). When the direction is different from the sign of the pulse information, the feed state is switched to the manual feed state (step se14) and the flow returns to step se2 (the handle mode checking step). On the other hand, when the direction matches the sign, the flow returns to step se2 (the handle mode checking step) directly (while maintaining the set automatic feed state).

When the handle mode is not selected in step se2, the feed handle operation determination unit B21 switches the feed state to the manual feed state (step se15) and this process ends.

The operation of the manual feed unit B23 will be described with reference to the flowchart of FIG. 11.

First, the manual feed unit B23 checks whether the handle mode is selected (step sf1). When the handle mode is selected, it is checked whether the manual feed state is selected (step sf2). When the manual feed state is set, a process of generating (step sf3) the movement amount using the pulse information from the manual pulse generator 80, updating (step sf4) the coordinate of the machine tool managed by the numerical controller 10 using the generated movement amount, and sending (step sf5) the movement amount to the amplifier is performed, and then, the flow returns to step sf1 (the handle mode checking step). On the other hand, when the handle mode is not selected (step sf1) or the manual feed state is not set (step sf2), this process ends.

According to Embodiment 2 of the present invention, when the feed handle operation determination unit B21 detects a specific operation of the manual pulse generator 80, the automatic feed unit A24 moves the slide A16 so that the tool and the workpiece automatically move relatively. In this way, the operator can perform automatic feed with an easy and intuitive operation. Moreover, since a special apparatus such as a dedicated handle is not required, it is possible to add an automatic feed mechanism to the numerical controller 10 at a low cost.

The present invention is not limited to the above-described embodiments but can be changed without departing from the spirit of the present invention. That is, the present invention can be changed in such a way that an arbitrary constituent element of the embodiment is modified or omitted within the scope of the present invention.

For example, in the above-described embodiments, an example in which a specific handle operation of the mechanical handle A10 or the manual pulse generator 80, which triggers the operation of the automatic feed unit A24, is detected on the basis of the index such as the continuous feed rate Vmax, the elapsed time To, the angle condition Ap, the stop count condition Np, and the time condition Tp has been described. However, the present invention is not limited to this but the specific handle operation can be detected on the basis of another arbitrary index.

Moreover, although a typical hardware configuration for implementing the present invention has been illustrated in the above-described embodiments, the present invention is not limited to this but an arbitrary function may be replaced with other hardware or software.

The content of the automatic feed command generated by the automatic feed unit A24 may include a feed direction and a feed rate which are set in advance, or alternatively, the automatic feed command may be calculated on the basis of a rotation direction, a rotation speed, or the like of the handle operation of the mechanical handle A10 or the manual pulse generator 80. For example, the direction of the automatic feed may be determined according to the rotation direction of the handle operation, and the automatic feed rate may be changed according to the height of the rotation speed.

In the above-described-embodiments, although the trigger for stopping the automatic feed is obtained on the basis of the positional deviation, the present invention is not limited to this. An arbitrary trigger may be used as long as an operation of rotating the handle in the opposite direction to the feed direction under the automatic feed command can be detected. For example, a load detection unit that detects the load of the motor 20 may be further included, and generation of the automatic feed command may be stopped when the load detection unit detects a predetermined load.

The invention claimed is:

1. A numerical controller controlling a machine tool by generating an automatic feed command for driving a motor, the machine tool including a drive shaft for moving a tool and a workpiece relatively, a feed handle for driving the drive shaft by using a mechanical mechanism, and the motor for driving the drive shaft, the numerical controller comprising a processor configured to:
  detect a first specific handle operation performed on the feed handle while the numerical controller is operating in a manual feed state for driving the drive shaft;
  in response to detecting the first specific handle operation, switch to an automatic feed state for driving the drive shaft and output the automatic feed command;
  detect a second specific handle operation performed on the feed handle while the numerical controller is operating in the automatic feed state; and
  in response to detecting the second specific handle operation, switch to the manual feed state.

2. A numerical controller controlling a machine tool by generating an automatic feed command for driving a motor, the machine tool including a drive shaft for moving a tool and a workpiece relatively, a manual pulse generator that generates a manual feed command on the basis of a rotation amount of a handle, and the motor for driving the drive shaft according to the manual feed command, the numerical controller comprising a processor configured to:
  detect a first specific handle operation performed on the manual pulse generator while the numerical controller is operating in a manual feed state for driving the drive shaft;
  in response to detecting the first specific handle operation, switch to an automatic feed state for driving the drive shaft and output the automatic feed command when the specific handle operation is detected;
  detect a second specific handle operation performed on the manual pulse generator while the numerical controller is operating in the automatic feed state; and
  in response to detecting the second specific handle operation, switch to the manual feed state.

3. The numerical controller according to claim 1, wherein the specific handle operation is an operation of rotating the handle at a predetermined speed in the same rotation direction.

4. The numerical controller according to claim 1, wherein the specific handle operation is an operation of stopping the handle at a predetermined rotation angle within a predetermined period for a predetermined number of times.

5. The numerical controller according to claim 1, wherein a feed direction and a feed rate commanded by the automatic feed command are a predetermined direction and a predetermined speed.

6. The numerical controller according to claim 1, wherein the feed direction and the feed rate commanded by the automatic feed command are calculated on the basis of a rotation direction and a rotation speed of the specific handle operation.

7. The numerical controller according to claim 1, wherein the processor detects a second specific handle operation, and the processor stops generating the automatic feed command when the second specific handle operation is detected.

8. The numerical controller according to claim 1, wherein the processor detects a load of the motor, and the processor stops generating the automatic feed command when a predetermined load is detected.

9. The numerical controller according to claim 7, wherein the second specific handle operation is an operation of rotating the handle in an opposite direction to the feed direction under the automatic feed command.

* * * * *